(12) United States Patent
Young et al.

(10) Patent No.: US 9,908,814 B1
(45) Date of Patent: Mar. 6, 2018

(54) CEMENTITIOUS COMPOSITIONS AND METHODS OF MAKING AND USING THE SAME

(71) Applicant: Cement Squared, Inc., East Garafraxa (CA)

(72) Inventors: Walter David Young, Toronto (CA); John Holley, Orlando, FL (US)

(73) Assignee: Cement Squared, Inc., East Garafraxa (CA)

( * ) Notice: Subject to any disclaimer, the term of this patent is extended or adjusted under 35 U.S.C. 154(b) by 0 days.

(21) Appl. No.: 15/499,539

(22) Filed: Apr. 27, 2017

(51) Int. Cl.
| | |
|---|---|
| *C04B 28/02* | (2006.01) |
| *C04B 18/14* | (2006.01) |
| *C04B 14/10* | (2006.01) |
| *C04B 24/38* | (2006.01) |
| *C04B 18/02* | (2006.01) |

(52) U.S. Cl.
CPC .......... *C04B 28/021* (2013.01); *C04B 14/106* (2013.01); *C04B 18/02* (2013.01); *C04B 18/146* (2013.01); *C04B 24/383* (2013.01); *C04B 2201/50* (2013.01)

(58) Field of Classification Search
CPC ..... C04B 28/021; C04B 18/146; C04B 18/02; C04B 14/106; C04B 24/383; C04B 2201/50
See application file for complete search history.

(56) References Cited

U.S. PATENT DOCUMENTS

| | | | | |
|---|---|---|---|---|
| 4,640,715 A | * | 2/1987 | Heitzmann | ........... C04B 28/006 106/706 |
| 4,642,137 A | * | 2/1987 | Heitzmann | ........... C04B 12/005 106/607 |
| 8,715,786 B2 | * | 5/2014 | Bonin | ..................... B28C 5/026 427/426 |

FOREIGN PATENT DOCUMENTS

WO    WO 2006/070960 A1 *  7/2006

* cited by examiner

*Primary Examiner* — Anthony J Green
(74) *Attorney, Agent, or Firm* — McKee, Voorhees & Sease, PLC

(57) ABSTRACT

The invention relates to cementitious compositions, concrete compositions, and methods of making and using the cementitious compositions in the preparation of concrete. In particular, the cementitious compositions comprise a saccharide. In an aspect of the invention, the concrete compositions have improved properties, which can include, but are not limited to, increased flexural and compressive strength, improved wear, reduced permeability, and reduced slumping.

19 Claims, 3 Drawing Sheets

CEMENTITIOUS COMPOSITIONS AND METHODS OF MAKING AND USING THE SAME

FIELD OF THE INVENTION

The invention relates to cementitious compositions, concrete compositions, methods of making cementitious compositions, and methods of using the cementitious compositions in the preparation of concrete. In particular, the cementitious compositions comprise saccharide.

BACKGROUND OF THE INVENTION

Cement is used to prepare concrete and concrete is used in a wide variety of applications, including, but not limited to, roads, parking lots, bridges, walkways, support structures such as walls, foundations, and beams. Concrete can often be exposed to the outdoors and in particular to water. Additionally, in many geographic regions, concrete can be exposed to significant temperature changes from winter to summer, in addition to rain, snow, and significant changes in humidity. Further, concrete is often subject to significant wear and stress. For example, concrete may be used as part of a structural support for a building where it supports significant weight and must be capable of withstanding storms and high winds. Over the last 50 years, cements and concretes have seen a number of minor improvements; however, the general strength and durability has largely remained the same, particularly of the cement.

Further, much attention has recently been directed to chloride ion penetration of concrete compositions due to the corrosion of reinforced steel in reinforced concrete. Corrosion related damage to many structures has been a significant problem, which is discussed in "Rapid Chloride Permeability Testing" by Prakash Joshi and Cesar Chan, Publication #CO2L037 2002, Hanley-Wood, LLC. Chloride ions can penetrate concrete in various ways. For example, Joshi and Chan report that chloride ions penetrate crack-free concrete by capillary absorption, hydrostatic pressure, diffusion, and evaporative transport. The end-result is that the rebar ultimately corrodes resulting in structural deficiencies and necessary repairs. To address this problem, cement compositions have been prepared with the inclusion of corrosion inhibitors. However, including corrosion inhibitors does not ultimately prevent corrosion from occurring, it merely delays corrosion. And the addition of corrosion inhibitors can be expensive in cement formulation.

Accordingly, it is an objective to provide cement compositions used in concrete such that the concrete has improved physical properties such as reduced permeability and increased compressive and flexural strength.

Another object of the invention is to provide cement compositions used in concrete such that the concrete has improved chloride ion penetrability.

Still another object of the invention is to provide a cost savings by reducing the amount of cementitious materials necessary for preparation of concrete while obtaining certain physical properties.

Other objects, advantages and features of the present invention will become apparent from the following specification.

SUMMARY OF THE INVENTION

An advantage of the invention is found in the improved flexural strength and modular strength of the concrete compositions prepared with the cement compositions of the invention. It is also an advantage of the present invention that the compositions are obtain certain physical improvements while requiring less volume of cement.

In an embodiment, the present invention comprises a cementitious composition comprising between about 40 wt. % and about 55 wt. % of fly ash and/or slag cement; between about 0.05 wt. % and about 0.5 wt. % of a saccharide; and between about 25 wt. % and about 50 wt. % of metakaolin and/or pumice.

In a further embodiment, the present invention comprises a concrete composition comprising an aggregate; a cementitious composition comprising fly ash and/or slag cement in an amount between about 40 wt. % and about 55 wt. % of the cementitious composition; a saccharide in an amount between about 0.05 wt. % and about 0.5 wt. % of the cementitious composition; and metakaolin and/or pumice in an amount between about 25 wt. % and about 50 wt. % of the cementitious composition.

Still a further embodiment of the invention is found in a method of preparing concrete comprising mixing an aggregate and a cementitious composition with water; wherein the water to cementitious composition ratio is less than about 0.6; wherein the cementitious composition comprises fly ash and/or slag cement in an amount between about 40 wt. % and about 55 wt. % of the cementitious composition; a saccharide in an amount between about 0.05 wt. % and about 0.5 wt. % of the cementitious composition; and metakaolin and/or pumice in an amount between about 25 wt. % and about 50 wt. % of the cementitious composition; applying the mixture of aggregate, cementitious composition and water; wherein applying comprises pouring, pumping, and/or shoveling; and curing the mixture to form a cured concrete composition.

While multiple embodiments are disclosed, still other embodiments of the present invention will become apparent to those skilled in the art from the following detailed description, which shows and describes illustrative embodiments of the invention. Accordingly, the figures and detailed description are to be regarded as illustrative in nature and not restrictive. Reference to various embodiments does not limit the scope of the invention.

Figure 1:
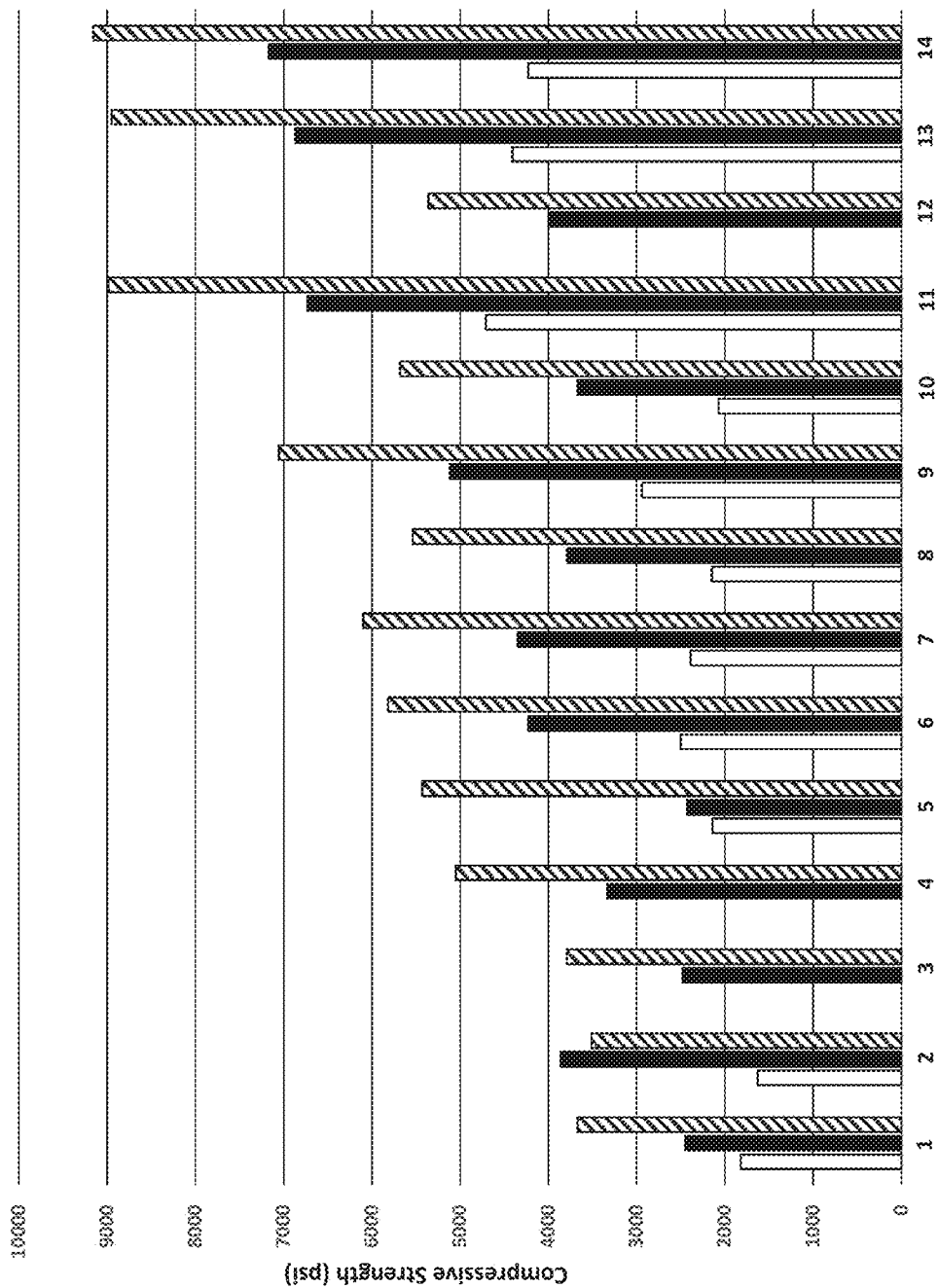
FIG. 1 shows a graph of compressive strength in pounds per square inch (psi) of concrete samples prepared from the cement compositions with varying formulations from Example 7. The white bars show compressive strength at three days. The black bars show the compressive strength at seven days. The hatched bars show the compressive strength at twenty-eight days.

The figures represented herein are not limitations to the various embodiments according to the invention and are presented for exemplary illustration of some embodiments of the invention.

DETAILED DESCRIPTION OF THE PREFERRED EMBODIMENT

The present invention relates to cementitious compositions, methods of making the cementitious compositions and methods of using the cementitious compositions. In another aspect of the invention, the invention relates to concrete compositions, methods of making and using concrete compositions comprising the cementitious compositions described herein. The cementitious compositions and concrete compositions have many advantages over conventional cementitious and concrete compositions. For example, the concrete compositions prepared from the cement compositions have improved flexural strength, improved modular strength, and improved durability. Further, the cement compositions can provide any or all of the improved properties with less volume of cement. This results in a cost savings based on the amount of cement required for a particular application.

The embodiments of this invention are not limited to particular methods of applying concrete compositions to a surface or preparation of formed concrete products, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾ This applies regardless of the breadth of the range.

Definitions

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring techniques and equipment, with respect to any quantifiable variable, including, but not limited to, mass, volume, time, distance, voltage, current, and pressure. Further, given solid and liquid handling procedures used in the real world, there is certain inadvertent error and variation that is likely through differences in the manufacture, source, or purity of the ingredients used to make the compositions or carry out the methods and the like. Whether or not modified by the term "about," the claims include equivalents to the quantities.

The term "microparticle" as used herein is intended to refer to particles that have at least one dimension that is one or more micrometers and less than one millimeter.

The term "nanoparticle" as used herein is intended to refer to particles that have at least one dimension that is less than one micrometer.

The term "slump," as used herein when referring to a cementitious mix, means the amount of subsidence of a concrete composition. Conventionally, slump has been measured by the ASTM C143 standard test procedure, which measures the amount of subsidence of a cementitious composition after removing a supporting cone, as specified in the test procedure.

The methods, systems, apparatuses, and compositions of the present invention may comprise, consist essentially of, or consist of the components and ingredients of the present invention as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

Cementitious and Concrete Compositions

The cement compositions of the invention are hydraulic and pozzolanic cementitious compositions, i.e., cement compositions that react with water to form concrete. As used herein, the term cementitious material generally refers to a component included in concrete, and concrete refers to compositions that generally includes one or more aggregates (e.g., a coarse aggregate and/or a fine aggregate). The cement compositions of the invention can be included in a concrete composition in an amount between about 1 wt. % and about 60 wt. %. In an aspect of the invention, the cementitious compositions can be used to substitute a traditional cementitious composition; in such an embodiment, preferably the substitution is between about 5 wt. % and about 60 wt. %.

The cementitious compositions include at least three components in addition to the water necessary for reacting the cementitious composition. The first component includes an aggregate, fly ash and/or slag cement. The second component is a saccharide. The third component is a natural pozzolan, such as metakaolin and/or pumice. Optionally, the cementitious compositions can include a fourth component for increased durability; the fourth component can include, but is not limited to, metal particles and/or silica fume. Concrete compositions comprising the cementitious material described herein can optionally contain various functional ingredients to provide desired properties.

The cementitious compositions can be included in a concrete composition to prepare concrete. In adding the cementitious compositions to a concrete composition, the concrete composition can have fine aggregate and/or coarse aggregate. Other components described herein as being optional to the cementitious compositions can be included in the concrete composition.

The cementitious compositions can be used in new concrete, replacement concrete, as part of a concrete mix, as an overlay to an existing surface, and/or to fill or patch holes and/or cracks in a surface, preferably a concrete surface. The cementitious compositions are suitable for use in roads, parking lots, sidewalks, trails, tarmacs, or other such similar surfaces composed of asphalt, concrete, or masonry surfaces. The cementitious compositions can also be used in molded concrete products. The concrete prepared with the cementitious compositions can be molded into various shapes and products, including, but not limited to, barricades, blocks for parking lots or other applications, etc. The cementitious compositions can be used in reinforced concrete and in structural concrete products, such as beams, foundations, walls, etc.

In some embodiments, concrete comprising the cementitious composition can have improved flexural strength, improved compressive strength, improved abrasion resistance, and combinations thereof.

First Component

The cementitious compositions include a first component. The first component can comprise, consist essentially of, or consist of fly ash, slag cement, or mixtures thereof. The cementitious compositions can comprise between about 35 wt. % and about 60 wt. % of the first component, preferably between about 40 wt. % and about 55 wt. % of the first component, and most preferably between about 45 wt. % and about 50 wt. % of the first component.

Fly Ash

The cementitious compositions can include fly ash. Preferred fly ash includes, but is not limited to fly ash type C and fly ash type F. If the cementitious composition includes fly ash, the fly ash can be between about 0.1 wt. % and about 100% of the first component.

Slag Cement

The cementitious compositions can include slag cement (also referred to as ground granulated blast-furnace slag (GGBFS)). If the cementitious composition includes slag cement, the slag cement can be between about 0.1 wt. % and about 100% of the first component.

Second Component

The cementitious compositions include a saccharide as a second component. Suitable saccharides include, but are not limited to, monosaccharides, disaccharides, oligosaccharides, and mixtures thereof. Preferred saccharides include, but are not limited to, fructose, galactose, glucose, dextrose, lactose, maltose, sucrose, and mixtures thereof. Most preferably, the saccharide comprises, consists essentially of, or consists of sucrose. Suitable saccharides can be naturally derived or synthesized. A preferred saccharide is cane sugar, natural and/or refined. Preferably, the saccharide is between about 0.05 wt. % and about 0.5 wt. % of the cementitious composition, more preferably the saccharide is between about 0.07 wt. % and about 0.3 wt. % of the cementitious composition, most preferably the saccharide is about 0.1 wt. % of the cementitious composition.

Third Component

The cementitious compositions include a natural pozzolan as a third component. The natural pozzolan can be between about 25 wt. % and about 50 wt. % of the cementitious composition, preferably between 30 wt. % and about 45 wt. % of the cementitious composition, more preferably between about 35 wt. % and about 40 wt. % of the cementitious composition. The third component can comprise, consist essentially of, or consist of metakaolin and/or pumice.

Metakaolin

The cementitious compositions can include metakaolin. If the cementitious composition includes metakaolin, the metakaolin can be between about 0.1 wt. % and about 100% of the third component.

Pumice

The cementitious compositions can include pumice. Suitable pumice can include, but is not limited to, pumice sand, pumice rock, and pumice powder. If the cementitious composition includes metakaolin, the metakaolin can be between about 0.1 wt. % and about 100% of the third component.

Fourth Component

In preferred embodiments, the cementitious compositions include an optional fourth component. The fourth component can comprise metal particles, silica fume, or a combination thereof. If included, the fourth component can be between about 0.01 wt. % and about 20 wt. %.

Metal Particles

The cementitious compositions can include metal particles. Suitable metal particles can include, but are not limited to, metals in Group 1A and Group 2A, transition metals, post transition metals, and mixtures and combinations thereof. The aforementioned metals can be in a variety of forms, such as, in their elemental states, in compounds or complexes. Preferred forms include, but are not limited to, carbon nanotubes, fullerenes, metal oxides, metal carbides, metal nitrides, and organometallic complexes. Preferred metal particles include zinc oxide particles. In a preferred embodiment, the metal particles comprise microparticles and/or nanoparticles. In a most preferred embodiment, the metal particles comprise nanoparticles.

If the cementitious composition includes metal particles, the metal particles can be between about 0.1 wt. % and about 100% of the fourth component. In some embodiments of the invention, the amount of metal particles in the cementitious composition can be between about 0.0001 wt. % and about 10 wt. %, preferably between about 0.001 wt. % and about 5 wt. %, more preferably between about 0.05 wt. % and about 2 wt. %.

Silica Fume

The cementitious compositions can include silica fume. When included in the cementitious compositions, the silica fume can be between about 0.1 wt. % and about 100% of the fourth component. In some embodiments, it is preferable to reduce or eliminate silica fume. Thus, in certain embodiments, the cementitious compositions can have less than about 5 wt. %, preferably less than about 2 wt. %, more preferably less than about 1.5 wt. %, and most preferably less than about 0.5 wt. %.

Additional Components for the Compositions

The cementitious compositions can be used in preparation of concrete compositions. The concrete compositions will generally include one or more aggregates, preferably a fine aggregate and a coarse aggregate. The cementitious and/or concrete compositions can optionally include a variety of additional ingredients, including, but not limited to, accelerators, corrosion inhibitors, plasticizers, retardants, pigments, Portland cement, reflective particles, and other optional functional ingredients.

Accelerators

Accelerators can optionally be included in the cementitious and/or concrete compositions to accelerate the speed of hydration and hardening of the concrete compositions. Suitable accelerators include, but are not limited to, a nitrate salt of an alkali metal, alkaline earth metal, and/or aluminum; a nitrite salt of an alkali metal, alkaline earth metal, and/or aluminum; a thiocyanate of an alkali metal, alkaline earth metal and/or aluminum; an alkanolamine; a thiosulfate of an alkali metal, alkaline earth metal, and/or aluminum; a hydroxide of an alkali metal, alkaline earth metal, and/or aluminum; a carboxylic acid salt of an alkali metal, alkaline earth metal, and/or aluminum (preferably calcium formate); a polyhydroxylalkylamine; a halide salt of an alkali metal and/or alkaline earth metal (e.g., a chloride or a fluoride). Preferred accelerators include calcium-containing compounds, such as calcium oxide, calcium hydroxide, calcium nitride, calcium stearate, and calcium chloride; and magnesium-containing compounds, such as magnesium hydroxide, magnesium oxide, magnesium chloride, or magnesium nitrate.

Aggregates

The cementitious and/or concrete compositions can include one or more aggregates. Aggregates include, but are not limited to, crushed stone, gravel, limestone, minerals, recycled concrete, sand, silicates, zeolites, and combinations thereof. The aggregate can be natural, manufactured, recycled, or a mixture thereof.

Aggregates can optionally be included in the cement compositions; however, it is preferable for the aggregate to be in the concrete composition and not the cement composition. If the cement composition includes an aggregate, the aggregate can be between about 0.1 wt. % and about 70% of the compositions.

Corrosion Inhibitors

The cementitious and/or concrete compositions can optionally include a corrosion inhibitor. Suitable corrosion inhibitors include, but are not limited to, alkali metal or alkaline earth metal nitrates, alkali metal or alkaline earth metal nitrites, alkanolamines, hydroxylamines, silanes (such as alkylalkoxysilanes), siloxanes (such as alkylalkyoxysiloxanes), and combinations thereof. Suitable corrosion inhibitors are disclosed in U.S. Pat. No. 3,210,207, U.S. Pat. No. 3,801,338, U.S. Pat. No. 3,976,494, U.S. Pat. No. 4,092,109, U.S. Pat. No. 4,365,999, U.S. Pat. No. 4,726,914, U.S. Pat. No. 6,685,766, and EP No. 0 209 978, each of which is incorporated herein by reference in its entirety. In some embodiments of the invention, the compositions can have less than 2 wt. %, preferably less than 1 wt. %, more preferably less than 0.5 wt. %, and most preferably less than 0.1 wt. % of a corrosion inhibitor. In a preferred embodiment of the invention, the compositions do not contain a corrosion inhibitor.

Plasticizers

The cementitious and/or concrete compositions can optionally include a plasticizer. Plasticizers can act as water reducers and/or dispersants added to improve workability of the mixture. Suitable plasticizers include, but are not limited to, lignosulfonates, derivatives of lignosulfonates, formaldehyde condensates of at least one compound selected from the group consisting of methylolation and sulfonation products of each of naphthalene, melamine, phenol, urea, and aniline, examples of which include metal naphthalenesulfonate-formaldehyde condensates, metal melaminesulfonate-formaldehyde condensates, phenolsulfonic acid formaldehyde condensate, and phenol-sulfanilic acid-formaldehyde co-condensates; polymers and copolymers obtained by polymerizing at least one monomer selected from the group consisting of unsaturated monocarboxylic acids and derivatives thereof, and unsaturated dicarboxylic acids and derivatives thereof; polycarboxylates; and combinations thereof.

Pigments

The cementitious and/or concrete compositions can also optionally include one or more pigments to color the composition. The amount of pigment can vary based on the composition, pigment selected, end use, and desired color. In an aspect of the compositions, the pigment can be included in the cementitious composition, coated on top of a concrete composition, and/or added to a specific layer of the concrete composition. In an embodiment, the pigment can be added to the cementitious and/or concrete composition in an amount between about 0.05 wt-% and about 5 wt-%.

Portland Cement

Optionally, the concrete compositions can also include a Portland cement in addition to the cement compositions described herein. Suitable Portland cements, can include, but are not limited to, Type I, Type II, Type III, Type IV, Type V, and mixtures thereof. If the cement composition includes Portland cement, the Portland cement can be between about 0.1 wt. % and about 100% of the concrete compositions.

Reflective Particles

The cementitious and/or concrete compositions can also optionally include one or more reflective particles. Suitable reflective particles can include, but are not limited to, metals, metal oxides, silicates, silicon oxides, or combinations thereof. In an aspect of the compositions, the reflective particles can be included in the cementitious and/or concrete compositions, coated on top of a concrete compositions, and/or added to a specific layer of a concrete compositions. In an embodiment, the reflective particles can be added to the cementitious and/or concrete compositions in an amount between about 0.001 wt-% and about 5 wt-%.

Retardants

Retardants can optionally be included in the cementitious and/or concrete compositions to retard the hydration and hardening of the concrete composition. Suitable retardants include, but are not limited to, carbohydrates; sugar acids or sugar bases and their salts, such as sodium gluconate and sodium glucoheptonate; phosphonates, such as nitrilotri (methylphosphonic acid), 2-phosphonobutane-1,2,4-tricarboxylic acid; and chelating agents, such as ethylenediaminetetraacetic acid (EDTA), citric acid, nitrilotriacetic acid, sodium sulfate, firmed silica, colloidal silica, hydroxyethyl cellulose, hydroxypropyl cellulose, mineral oils (such as light naphthenic), hectorite clay, polyoxyalkylenes, natural gums, or mixtures thereof, polycarboxylate superplasticizers, naphthalene HRWR (high range water reducer), an oxy-boron compound, lignin, a polyphosphonic acid, a carboxylic acid, a hydroxycarboxylic acid, polycarboxylic acid, hydroxylated carboxylic acid, such as fumaric, itaconic, malonic, borax, gluconic, and tartaric acid, lignosulfonates, ascorbic acid, isoascorbic acid, sulphonic acid-acrylic acid copolymer, and their corresponding salts, polyhydroxysilane, polyacrylamide. Illustrative examples of retarders are set forth in U.S. Pat. Nos. 5,427,617 and 5,203,919, each of which is incorporated herein by reference in its entirety.

Molded and Reinforced Concrete

In embodiments of the invention, the cementitious compositions can be used in a molded and/or reinforced concrete composition. As such, a concrete composition can include the cementitious compositions of the invention as well as a structural support, such as a steel bar, plate, or other reinforcement structure. Further, the cementitious compositions can be used in a molded concrete composition. The molded concrete compositions can be molded into any desired shape. Preferred shapes, include, but are not limited to, rectangles, squares, cylinders. Preferred concrete molds include, but are not limited to, those for bricks, walls, beams, parking blocks, and tiles. The invention is not limited to particular methods or apparatuses of concrete formwork. Preferred methods of preparing molded concrete comprising the cementitious compositions include, but are not limited to, slip forming, steel plate construction, and precasting.

Other methods of preparing molded concrete products comprising the cementitious compositions can also be employed.

Embodiments of the Compositions

Preferably, the cementitious compositions provide a concrete composition having one or more improved properties. Exemplary properties that can be improved include, but are not limited to, flexural strength, compressive strength, durability, wear resistance, and reduced slumping.

For example, in some embodiments, the concrete prepared with the cement compositions of the invention can have increased flexural strength of at least about 10%, more preferably at least about 25%, and most preferably at least about 40% when compared with concrete prepared with a typical cement composition and without the cement composition of the invention. A preferred method of testing such flexural strength improvement is with the ASTM C78/C78M-16 test, "Standard Test Method for Flexural Strength of Concrete (Using Simple Beam with Third-Point Loading)."

In some embodiments, the concrete prepared with the cement compositions can have increased compressive strength of at least about 10%, preferably at least about 25%, more preferably at least about 40% when compared with concrete prepared with a typical cement composition and without the cement compositions of the invention. In a most preferred embodiment the compressive strength is increased by between about 50% and about 100% when compared with concrete prepared with a typical cement composition and without the cement composition of the invention. A preferred method of testing such compressive strength improvement is with the ASTM C39/C39M-16b test, "Standard Test Method for Compressive Strength of Cylindrical Concrete Specimens."

In some embodiments, the concrete prepared with the cement compositions can have a lower chloride ion permeability of at least about 50%, more preferably by at least about 75%, and most preferably by at least about 85% when compared with concrete prepared with a typical cement composition and without the cement compositions of the invention. A preferred method of testing the improvement in permeability is with the ASTM C-1202, "Standard Test Method for Electrical Indication of Concrete's Ability to Resist Chloride Ion Penetration."

In some embodiments, the concrete prepared with the cement compositions can have reduced shrinkage of about 25% to about 50% when compared with concrete prepared with a typical cement composition and without the cement compositions of the invention. A preferred method of testing such an improvement is with the ASTM C426-16 test, "Standard Test Method for Linear Drying Shrinkage of Concrete Masonry Units."

In some embodiments, the concrete prepared with the cement compositions can have higher abrasion resistance by about 10% to about 75% when compared with concrete prepared with a typical cement composition and without the cement compositions of the invention. A preferred method of testing such an improvement is with the ASTM C779/C779M-12 test, "Standard Test Method for Abrasion Resistance of Horizontal Concrete Surfaces."

In some embodiments, the concrete prepared with the cement compositions can have lower moisture emission by about 25% to about 40% when compared with concrete prepared with a typical cement composition and without the cement compositions of the invention. A preferred method of testing such an improvement is with the ASTM F1869-16a test, "Standard Test Method for Measuring Moisture Vapor Emission Rate of Concrete Subfloor Using Anhydrous Calcium Chloride."

In some embodiments, the concrete prepared with the cement compositions can have lower water absorption by about 40% to about 60% when compared with concrete prepared with a typical cement composition and without the cement compositions of the invention. A preferred method of testing such an improvement is with the ASTM C1585-13 test, "Standard Test Method for Measurement of Rate of Absorption of Water by Hydraulic-Cement Concretes."

In preferred embodiments, the concrete prepared with the cement compositions can have any combination of the aforementioned improvements. While not wishing to be bound by the theory it is believed that these improvements are at least in part due to the formulation, including the first, second, and third components in their respective weight percentages. Further, it has been found that the inclusion of a metal particle and/or silica fume can improve the properties, including, preferably the hardness. Moreover, in certain embodiments it is believed that the method of preparing the compositions can influence and improve the properties. For example, in a preferred embodiment, it is found that mixing with a high impact mixer can improve the properties of the resultant concrete.

Methods of Preparing and Using the Compositions

In some embodiments of the invention, the ingredients of the cementitious compositions can be mixed together to form the cementitious compositions. Preferably, the components can be added based on the weight—largest weight to smallest weight. The mixing of the ingredients can be done in batches or as part of a continuous system to prepare the cementitious compositions. The components can be mixed as added or mixed all together. Preferably they are mixed as added. In a preferred embodiment the components are aggressively mixed.

In preparing concrete or other such material comprised of the cementitious compositions, it can be preferable to maintain a preferred water to cement ratio (also referred to as the water to cementitious composition ratio). The water cement ratio is the value of the volume of water divided by the mass of cement. Preferably, the water to cement ratio is about 0.6 or less, more preferably 0.5 or less, and most preferably about 0.4 or less.

Further, the ingredients of the cement composition can be mixed with the other components of a concrete composition to form a ready-mix concrete composition. A ready-mix concrete composition can include any or all of the ingredients. The various components can be mixed in any order to form a ready-mix concrete composition. The mixing of the ingredients can be done in batches or as part of a continuous system to form the concrete compositions. Water can be added at the time of use or within a few hours prior to use, preferably less than 6, more preferably less than 3, most preferably less than 2 hours. If the water is added prior to the time of use, it is preferable that the concrete composition mixed with water be rotated or mixed periodically to slow the hydration and hardening of the mixture. This can be done by any suitable apparatus, including a concrete truck, a drum mixer, a paddle mixer, manually, etc. In preferred embodiments, the cementitious compositions of the invention can be incorporated in a standard replacement procedure used for conventional concrete production facilities.

In embodiments of the invention, the cementitious composition can be mixed with high-energy mixing to prepare finished product.

The concrete mixture containing the cementitious compositions can be applied by any by any and all production facilities and in any suitable method of applying concrete. For example, the compositions can be ready mix, central mix, precast, shotcrete, grouts, oilwell cementing, and cast in place.

Subsequent to placement of the concrete mixture, the mixture is allowed to achieve cure. Prior to the curing process, the concrete compositions can be preformed, shaped and/or molded manually. The mixtures can be modified to increase the workability for such applications.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Cementitious compositions according to the invention were prepared and used in concrete compositions. The exemplary cementitious composition was comprised of about 48% fly ash, about 40% metakaolin, about 12% silica fume, and about 0.12% sucrose. The concrete compositions were prepared according to the formulations in Table 1. The water cement ratio in Table 1 is the value of the volume of water divided by the mass of cement.

TABLE 1

| Sample ID | Commercial Cement Composition | Exemplary Cement Replacement wt. % | Water Cement Ratio |
|---|---|---|---|
| 1080 | 100% | 0% | 0.78 |
| 1081 | 100% | 0% | 0.58 |
| 1082 | 85% | 15% | 0.78 |
| 1083* | 85% | 15% | 0.58 |
| 1084 | 100% | 0% | 0.45 |
| 1090 | 85% | 15% | 0.45 |
| 1091 | 100% | 0% | 0.35 |
| 1092 | 85% | 15% | 0.35 |
| 2103 | 80% | 20% | 0.40 |
| 2104 | 80% | 20% | 0.40 |
| 2105 | 80% | 20% | 0.40 |
| 2106 | 80% | 20% | 0.40 |
| 2107 | 80% | 20% | 0.40 |
| 2108 | 80% | 20% | 0.40 |

*Sample 1083 had a higher air concentration than the other samples.

Example 1

Cylinder Compressive 7-Day Strength Tests

Compositions from Table 1 were tested for compressive strength. Cylinders of the concrete samples prepared with the cement compositions of the invention were tested in accordance with ASTM C39/C39M-16b, "Standard Test Method for Compressive Strength of Cylindrical Concrete Specimens." The results are provided in Table 2 for the 7-day strength tests. Some of the samples were tested twice, which is reflected below.

TABLE 2

| Sample ID | Strength (MPa) 7 days |
|---|---|
| 1080 | 13.7 |
| 1081 | 32.8 |
| 1082 | 21.3 |
| 1083 | 30.6 |
| 1084 | 44.1 |
| 1090 | 46.1 |
| 1091 | 51.9 |
| 1092 | 53.4 |
| 2103 | 57.4 |
| 2105 | 56.0 |
| 2107 | 60.4 |

As can be seen from the data, the concrete samples including the exemplary cementitious composition of the invention provided better test results than the concrete prepared solely from the commercially available cement. The exception being sample 1083, which provided improvements in strength, but not has high as the other exemplary samples; this is believed to be due to the higher air content. While not wishing to be bound by the theory, it is believed that the water to cement ratio influences the penetrability of the concrete samples. Specifically, Abram's Law would indicate that a lower water to cement ratio would result in greater strength of the concrete. As the strength is related to the structure of the concrete, it is likely that the permeability is also improved by a reduced water to cement ratio value. Additionally, it can be seen the concrete prepared with higher substitution percentage (20%) provided higher strength.

Example 2

Cylinder Compressive 28-Day Strength Tests

Compositions from Table 1 were also tested for compressive strength using a 28-day test. Cylinders of the concrete samples prepared with the cement compositions of the invention were tested in accordance with ASTM C39/C39M-16b, "Standard Test Method for Compressive Strength of Cylindrical Concrete Specimens." The results are provided in Table 3 for the 28-day strength test. The 28-day test was performed on two cylinders; the data for both is provided along with the average of the two 28-day measurements.

TABLE 3

| Sample ID | Strength (MPa) 28 days | 28 days | Average |
|---|---|---|---|
| 1080 | 20.4 | 20.4 | 20.4 |
| 1081 | 42.6 | 42.8 | 42.7 |
| 1082 | 26.6 | 30.0 | 29.3 |
| 1083 | 40.1 | 41.7 | 40.9 |
| 1084 | 54.8 | 54.3 | 54.3 |
| 1090 | 59.7 | 59.7 | 59.7 |
| 1091 | 62.9 | 62.7 | 62.8 |
| 1092 | 64.6 | 67.5 | 66.1 |
| 2103 | 68.5 | 67.8 | 68.2 |

TABLE 3-continued

| | Strength (MPa) | | |
|---|---|---|---|
| Sample ID | 28 days | 28 days | Average |
| 2105 | 69.9 | 69.8 | 69.9 |
| 2107 | 71.6 | 70.9 | 71.3 |

As can be seen from the data, the concrete samples including the exemplary cementitious composition of the invention provided better test results than the concrete prepared solely from the commercially available cement. The exception being sample 1083, which provided improvements in strength, but not has high as the other exemplary samples; this is believed to be due to the higher air content. Additionally, it can be seen the concrete prepared with higher substitution percentage (20%) provided higher strength. While not wishing to be bound by the theory it is believed that the improvement among the concrete samples prepared with the same percentage of the exemplary cementitious composition of the invention (i.e., 15% replacement) is in part related to the lower water cement ratio as both were at a ratio of 0.35, which would be consistent with Abram's law. Notably, the other two samples performing well—samples 1084 and 1090—were performed at a water cement ratio of 0.45.

Example 3

7-Day Flexural Strength Tests

Compositions from Table 1 were also tested for flexural strength using a 7-day test for all samples tested. Additionally, some of the samples were tested at 28 days. Cylinders of the concrete samples prepared with the cement compositions of the invention were tested in accordance with C78/C78M-16 test, "Standard Test Method for Flexural Strength of Concrete (Using Simple Beam with Third-Point Loading)." The results are provided in Table 4 for the 7-day flexural strength test.

TABLE 4

| | Flexural Strength (MPa) | |
|---|---|---|
| Sample ID | 7 Days | 28 Days |
| 2104 | 6.5 | 7.8 |
| 2106 | 6.6 | 7.8 |
| 2108 | 6.4 | 7.6 |

Example 4

Replacement Materials in Concrete Mixes

The cement compositions of the invention were also tested as replacement materials for concrete mix designs. Tests were performed according to C-31, C-39, C-138, C-143, C-172, C-192, C-231, C-617, C-1064, and C-1542 to assess various properties of the concrete samples, including compressive and flexural strength. Two cement mixes were prepared incorporating a cement composition of the invention, which is referred to as the replacement composition in the Table. The cement mixes prepared were C3 IDOT and C4 IDOT mixes, including the cement composition of the invention. The mixes and certain properties are set forth below in Table 5.

TABLE 5

| Material | Type/Brand | C3 IDOT | C4 IDOT |
|---|---|---|---|
| Cement | Holcim I/II | 457 lbs. | 474 lbs. |
| Replacement Composition | Exemplary Composition of Invention | 114 lbs. | 119 lbs. |
| Fine Aggregate | Concrete Sand (Hallett Materials North DM) | 1706 lbs. | 1506 lbs. |
| Coarse Aggregate | Concrete Stone | 1413 lbs. | 1526 lbs. |
| Water | Local tap | 229 lbs. (27.5 gal.) | 254 lbs. (30.5 gal.) |
| Entrained Air | GRT SA-50 | 6% (dosed as needed) | 6% (dosed as needed) |
| Plasticizer | GRT 400 NC | 4 oz cwt. | 4 oz cwt. |
| Water Cement Ratio | | 0.40 | 0.43 |
| Total Volume: | | 27.0 ft.$^3$ | 27.0 ft.$^3$ |
| Unit Weight | | 145.1 pcf | 143.6 pcf |
| Air: | | 5.2% | 4.5% |
| Slump: | | 4 in. | 4 in. |

The ambient temperature when the concrete compositions were prepared was 67° F. Concrete cylinders were tested. The cylinders were tested at 3 days and at 7 days. The cylinders for the compressive tests had a diameter of 4.00 inches and an area of 12.57 inches squared. The data from the compressive tests is provided in Table 6 below.

TABLE 6

| | Total Load (lbs) | Compressive Strength (psi) | Type of Fracture (1-7) |
|---|---|---|---|
| C3 IDOT | | | |
| Sample 1 (3 days) | 54,180 | 4,310 | 3 |
| Sample 2 (3 days) | 54,760 | 4,360 | 5 |
| Sample 1 (7 days) | 72,910 | 5,800 | 3 |
| Sample 2 (7 days) | 70,020 | 5,570 | 6 |
| C4 IDOT | | | |
| Sample 1 (3 days) | 61,030 | 4,860 | 2 |
| Sample 2 (3 days) | 32,110 | 4,940 | 2 |
| Sample 1 (7 days) | 82,580 | 6,570 | 3 |
| Sample 2 (7 days) | 83,230 | 6,620 | 3 |

The cylinders tested in the flexural strength tests were 18 inches long and the other dimensions are provided with the data in Table 7 below.

TABLE 7

| | Width (in) | Depth (in) | Total Load (lbs) | Pressure at Rupture (psi) |
|---|---|---|---|---|
| C3 IDOT (3 days) | 6.13 | 6.02 | 7,580 | 610 |
| C3 IDOT (7 days) | 6.11 | 6.01 | 8,520 | 690 |
| C4 IDOT (3 days) | 6.13 | 6.01 | 8,810 | 720 |
| C4 IDOT (7 days) | 6.08 | 6.01 | 11,080 | 910 |

The flexural strength design was 640 psi. As can be seen in Tables 6 and 7, the compositions have improved compressive and flexural strength, particularly, after it has been set for seven days.

Example 5

Comparative Concrete Sample Test

A concrete sample comprising an exemplary cementitious composition of the invention was prepared and tested against a control composition. The compositions for the control and the exemplary concrete composition of the invention are provided in Table 8A. Table 8B provides the exemplary cementitious composition of the invention referenced in Table 8A.

TABLE 8A

| Component | Control Concrete Sample | Exemplary Composition |
| --- | --- | --- |
| NIST C989 Cement | 500 grams | 400 grams |
| Cementitious Composition | — | 100 grams |
| Std. C109 sand | 1375 grams | 1375 grams |
| Std. ¾ stone | 1375 grams | 1375 grams |
| Water | 242.5 mLs | 242.5 mLs |
| % Water | 48.5 | 48.5 |
| % Flow | 115.5 | 111.0 |

TABLE 8B

| Component | Cementitious Composition |
| --- | --- |
| Fly ash (Type C) | ~48 wt. % |
| Metakaolin | ~40 wt. % |
| Silica Fume | ~12 wt. % |
| Saccharide | ~0.5 wt. % |

The concrete compositions were teste according to ASTM C311, "Standard Test Methods for Sampling and Testing Fly Ash or Natural Pozzolans for Use in Portland-Cement Concrete." Three samples were tested for each composition. The results of the testing are shown in Table 9 below, including each of the three samples and the average of the three samples.

TABLE 9

|  | Control Concrete (MPa) | Exemplary Composition (MPa) |
| --- | --- | --- |
| 7 Day | 31.41 | 38.78 |
| 7 Day | 30.64 | 37.53 |
| 7 Day | 29.88 | 36.59 |
| 7 Day, Avg. | 30.64 | 37.64 |
| 28 Day | 36.56 | 50.93 |
| 28 Day | 38.48 | 50.30 |
| 28 Day | 35.57 | 51.52 |
| 28 Day, Avg. | 37.87 | 50.92 |

As can be seen from the data in Table 9, the exemplary concrete compositions prepared with the exemplary cement composition of the invention substituted for 20% of the standard cement composition had improved test results at 7-day mark and significantly better results at the 28-day mark.

Example 6

Varying Air Content and Water to Cement Ratios in Concrete Samples

Concrete compositions having varying air content were prepared and tested. The concrete compositions prepared included both concrete prepared with the cementitious compositions of the invention (samples 2, 3, 5, and 6) and control compositions without the cementitious compositions of the invention (samples 1 and 4). The cementitious compositions of the invention were prepared according to Table 8B.

The compressive strength at three days, seven days, and 28 days. Two samples were taken for each day and formulation. Additionally, the test samples were prepared and tested in accordance with ASTM C-1202 Standard Test Method for "Electrical Indication of Concrete's Ability to Resist Chloride Ion Penetration." One end of the sample disc is immersed in a salt (NaCl) water solution and the other in a solution of sodium hydroxide. A voltage of 60V DC is maintained across the ends of the disc during the test, which is conducted for 6 hours. The coulombs that pass through the sample during the 6-hour test are measured and indicate the penetrability of the composition to chloride ions. A greater coulomb value indicates high penetrability, which will result in faster corrosion. Thus, it is desired to have low coulomb value. Concrete samples are often, and preferably tested, after curing and after being subjected to water or moisture content for a period of time. This is considered to more accurately reflect the conditions of cement in the real world as cement will age and be exposed to moisture and water.

The results from the compressive strength tests and chloride ion penetrability tests are shown below in Table 10.

TABLE 10

|  | 1 | 2 | 3 | 4 | 5 | 6 |
| --- | --- | --- | --- | --- | --- | --- |
| Weight Percent of Inventive Cementitious Composition | 0 | 15 | 30 | 0 | 15 | 30 |
| Water: Cement Ratio | 0.68 | 0.67 | 0.64 | 0.39 | 0.39 | 0.41 |
| Air Added (grams) | 0 | 0 | 0 | 3.8 | 5 | 8.5 |
| Chloride Ion Penetrability at 28 days (Coulombs) | 4018 | 1336 | 848 | 2740 | 631 | 414 |
| Compressive Strength (MPa) |  |  |  |  |  |  |
| 3-day | 25.6 | 22.4 | 22.3 | 30.3 | 33.2 | 27.2 |
| 3-day | 22.4 | 22.2 | 22.7 | 34.2 | 33.1 | 29.1 |
| 3-day average | 25.7 | 22.3 | 22.5 | 32.2 | 33.1 | 28.2 |
| 7-day | 29.1 | 37.0 | 38.6 | 37.7 | 51.4 | 44.6 |
| 7-day | 31.6 | 37.4 | 38.9 | 36.5 | 49.6 | 43.8 |
| 7-day average | 30.4 | 37.2 | 38.7 | 37.1 | 50.5 | 44.2 |
| 28-day | 37.5 | 48.3 | 50.2 | 44.5 | 61.0 | 55.8 |
| 28-day | 37.1 | 48.5 | 50.1 | 43.9 | 62.2 | 54.0 |
| 28-day average | 37.3 | 48.4 | 50.1 | 44.2 | 61.6 | 54.9 |

The data in Table 10 shows the compositions having greater air content and lower water to cement ratio provided improved physical properties.

Example 7

Comparison of Concrete Compositions Having Varying Water to Cement Ratios and Concentrations of Cementitious Material Concrete compositions were prepared comprising an exemplary cementitious composition of the invention and tested in comparison with control concrete compositions prepared with a traditional cementitious composition not of the invention. The concrete compositions and results of the testing are provided in Tables 11A and 11B. Samples 1-3 and 12 are control concrete samples. Samples 4-11, 13, and 14 are concrete samples prepared with exemplary cementitious compositions of the invention.

TABLE 11A

|  | 1 | 2 | 3 | 4 | 5 | 6 | 7 |
|---|---|---|---|---|---|---|---|
| Amount Cementitious Composition (wt. %) | 23 | 23 | 23 | 23 | 23 | 15 | 20 |
| Water: Cement Ratio | 0.56 | 0.56 | 0.56 | 0.56 | 0.56 | 0.56 | 0.56 |
| Slump (inches) | 3.5 | 4 | 3.5 | 4 | 2.25 | 2.25 | 2 |
| Air Content (%) | 3.2 | — | 3.3 | 2.1 | — | — | 3.5 |
| Compressive Strength |  |  |  |  |  |  |  |
| 3-day (psi) | 1820 | 1630 | — | — | 2140 | 2500 | 2390 |
| 7-day (psi) | 2450 | 3860 | 2480 | 3330 | 2430 | 4230 | 4350 |
| 28-day (psi) | 3670 | 3510 | 3790 | 5050 | 5430 | 5820 | 6100 |

TABLE 11B

|  | 8 | 9 | 10 | 11 | 12 | 13 | 14 |
|---|---|---|---|---|---|---|---|
| Amount Cementitious Composition (wt. %) | 25 | 20 | 20 | 20 | 20 | 15 | 25 |
| Water: Cement Ratio | 0.56 | 0.5 | 0.6 | 0.4 | 0.4 | 0.4 | 0.4 |
| Slump (inches) | 1.5 | 2.25 | 2 | 2.5 | 7 | 2.5 | 1.5 |
| Air Content (%) | 3.3 | 2.8 | 3.0 | 2.5 | 6.2 | 2.4 | 2.3 |
| Compressive Strength |  |  |  |  |  |  |  |
| 3-day (psi) | 2150 | 2940 | 2070 | 4710 | — | 4410 | 4230 |
| 7-day (psi) | 3790 | 5120 | 3670 | 6730 | 4000 | 6870 | 7170 |
| 28-day (psi) | 5540 | 7053 | 5680 | 8990 | 5360 | 8950 | 9160 |

Figure 2:
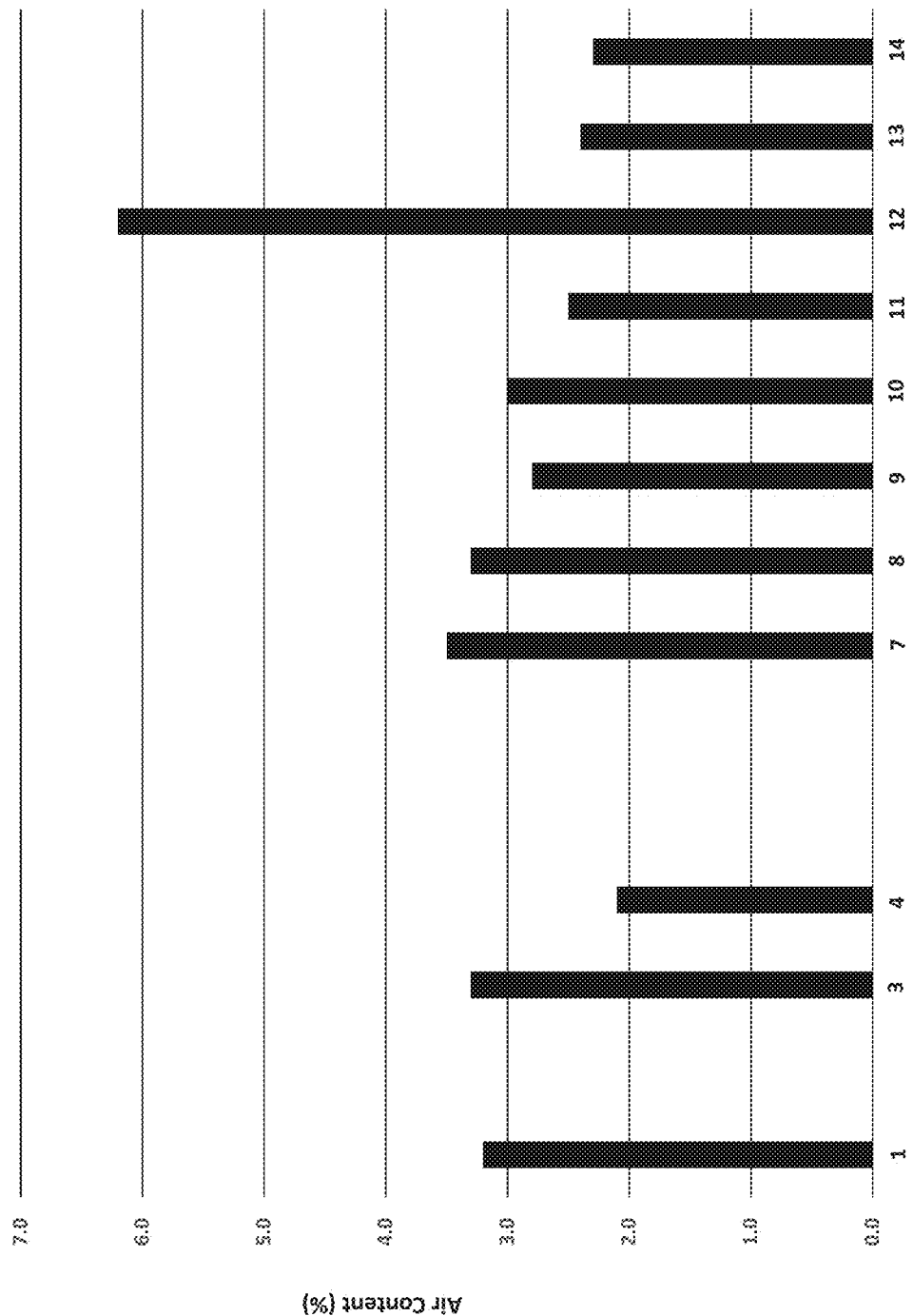
FIG. 2 shows a graph of the percent of air content in the concrete samples prepared from the cement compositions with varying formulations from Example 7.
Figure 3:
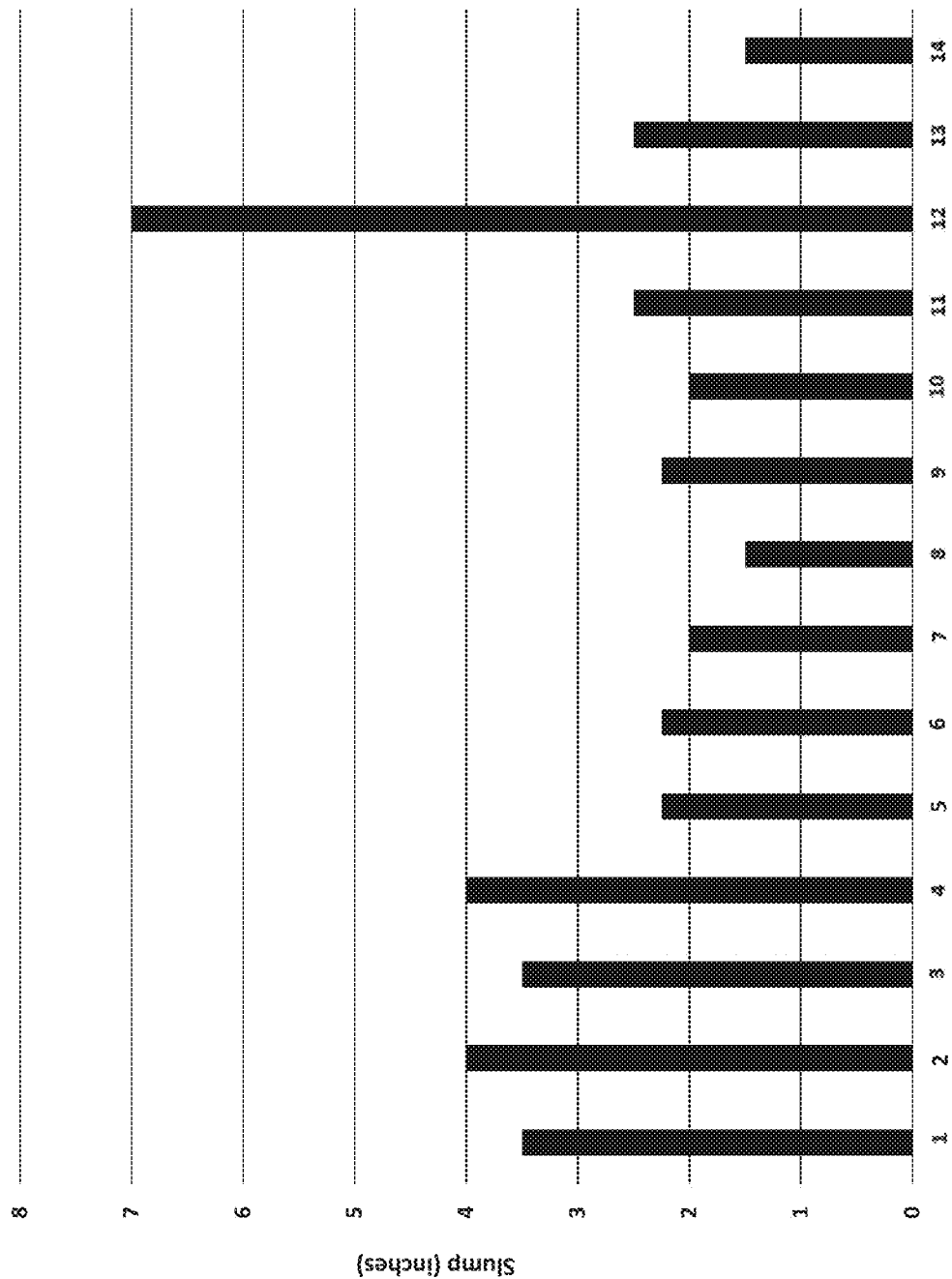
FIG. 3 shows a graph of the slump (in inches) of the concrete samples prepared from the cement compositions with varying formulations from Example 7.

The results in Tables 11A and 11B for the compressive strength, air content, and slump are shown in FIGS. 1-3, respectively. FIG. 1 shows the compressive strength in psi. The white bars show compressive strength at three days. The black bars show the compressive strength at seven days. The hatched bars show the compressive strength at twenty-eight days. As can be seen from FIGS. 1-3, a water to cement ratio of 0.5 or less is preferred, with a water to cement ratio of 0.4 being most preferred. Again, this is consistent with Abram's law. However, what is also notable is that the compositions including the cementitious composition of the invention performed unexpectedly better than the control samples having the same formulations and water to cement ratios except for the different cementitious compositions employed.

Example 8

Comparison of Concrete Compositions Comprising Cementitious Materials with and without Metal Particles Concrete compositions were prepared comprising two different exemplary cementitious compositions of the inventions; one with metal particles and the other without metal particles. These compositions were incorporated into traditional commercially available cement compositions at varying replacement weight percentages and concrete samples were prepared. The traditional commercially available cement compositions were also used to prepare concrete compositions as controls. The traditional cementitious compositions not of the invention were C3 IDOT and C4 IDOT. The various concrete compositions were tested for slump (in inches), air percentage, compressive strength at three and seven days, and flexural strength at three and seven days. Some, but not all, samples were tested for compressive strength at fourteen and twenty-eight days and for chloride ion penetrability. Standard test methods for each of these were again employed as set forth above. Tables 12A and 12B provide the cement composition information and the test results. The water to cement ratio is designated as w/cm in the Table.

TABLE 12A

| Mix Designation | Slump (in) | Air (%) | w/cm | Compressive Strength in PSI | | | | Flexural Strength in PSI | | | Set Times (Hrs) | Chloride Ion (Coulombs) |
|---|---|---|---|---|---|---|---|---|---|---|---|---|
|  |  |  |  | 3 | 7 | 14 | 28 | 3 | 7 | 28 |  |  |
| C3 Control | 4.25 | 5.8 | .45 | 4120 | 4770 | 5680 | 5910 | 540 | 620 | 740 640 | 5.75 | 2136 |
|  |  |  |  | 4060 | 5130 | 5520 | 6190 |  | 620 |  |  |  |
| C4 Control | 4 | 5.5 | .45 | 4570 | 5160 | 5820 | 6780 | 590 | 600 | 830 775 | 5.25 | 1779 |
|  |  |  |  | 4580 | 5250 | 5760 | 6930 |  | 600 |  |  |  |
| C3 with Exemplary Composition | 4 | 5.2 | .45 | 4310 | 5800 | 6070 | 6510 | 615 | 695 | 750 | 6.00 | 357 |
|  |  |  |  | 4360 | 5570 | 6150 | 6620 |  |  |  |  |  |
| C4 with Exemplary Composition | 4 | 4.5 | .45 | 4860 | 6570 | 7060 | 7620 | 715 | 750 | 790 | 5.25 | 365 |
|  |  |  |  | 4940 | 6620 | 7090 | 7530 |  |  |  |  |  |
| C4 with Exemplary Composition and MP 0.25 Grams/35.3 lbs cement | 4 | 5.5 | .45 | 4440 | 5970 | 6920 |  | 580 | 750 |  | 5.92 |  |
|  |  |  |  | 4320 | 5950 | 6820 |  |  |  |  |  |  |
| C4 with Exemplary Composition and Metal Particles 0.50/35.3 lbs cement | 4.25 | 5.8 | .45 | 4940 | 5920 | 6860 |  | 575 | 755 |  | 6.07 |  |
|  |  |  |  | 5090 | 5990 | 6710 |  |  |  |  |  |  |
| C4 with Exemplary Composition and Metal Particles 1.00/35.3 lbs. cement | 4 | 6.2 | .45 | 4620 | 5930 | 6830 |  | 580 | 755 |  | 6.21 |  |
|  |  |  |  | 4570 | 6000 | 6780 |  |  |  |  |  |  |
| C4 with Exemplary Composition and Metal Particles 1.50 Grams/35.3 lbs cement | 3.5 | 6.5 | .45 | 4700 | 5980 | 6770 |  | 570 | 760 |  | 6.33 |  |
|  |  |  |  | 4710 | 6360 | 6710 |  |  |  |  |  |  |

TABLE 12B

| Mix Designation | Slump (in) | Air (%) | w/cm | Compressive Strength (PSI) 3 | Compressive Strength (PSI) 7 | Flexural Strength (PSI) 3 | Flexural Strength (PSI) 7 | Set Times (Hrs) |
|---|---|---|---|---|---|---|---|---|
| C4 with 15% Replacement of Cement | 4.75 | 6.1 | .40 | 3030 2930 | 4610 4610 | 455 | 600 | 5.82 |
| C4 with 17.5% Replacement of Cement | 4 | 5.8 | .41 | 3130 3090 | 4720 4790 | 450 | 595 | 6.03 |
| C4 with 20% Replacement of Cement | 3.75 | 5.5 | .42 | 3210 3170 | 4930 4910 | 440 | 580 | 6.18 |
| C4 with 25% Replacement of Cement | 3.25 | 5 | .42 | 3320 3270 | 5010 5020 | 445 | 570 | 6.28 |

As can be seen in Tables 12A and 12B, the concrete samples prepared with the exemplary cementitious compositions of the invention have significantly improved properties, particularly with respect to the chloride ion penetrability, in comparison with the concrete samples prepared with the traditional commercially available cement formulations (i.e., DOT C3 and DOT C4).

The inventions being thus described, it will be obvious that the same may be varied in many ways. Such variations are not to be regarded as a departure from the spirit and scope of the inventions and all such modifications are intended to be included within the scope of the claims.

What is claimed is:

1. A cementitious composition comprising:
   between about 40 wt. % and about 55 wt. % of fly ash and/or slag cement;
   between about 0.05 wt. % and about 0.5 wt. % of a saccharide;
   between about 25 wt. % and about 50 wt. % of metakaolin and/or pumice; and
   between about 0.01 wt. % and about 20 wt. % of silica fume.

2. The cementitious composition of claim 1, wherein the fly ash and/or slag cement is between about 45 wt. % and about 50 wt. % of the cementitious composition; and wherein the metakaolin and/or pumice is between about 35 wt. % and about 40 wt. % of the cementitious composition.

3. The cementitious composition of claim 1, wherein the saccharide comprises sucrose.

4. The cementitious composition of claim 1, wherein the saccharide comprises cane sugar.

5. The cementitious composition of claim 1, further comprising metal particles between about 0.0001 wt. % and about 5 wt. % of the cementitious composition.

6. The cementitious composition of claim 5, wherein the cementitious composition contains between about 0.01 wt. % and about 2 wt. % of silica fume, and wherein the metal particles comprise zinc.

7. A concrete composition comprising:
   an aggregate;
   a cementitious composition comprising fly ash and/or slag cement in an amount between about 40 wt. % and about 55 wt. % of the cementitious composition; a saccharide in an amount between about 0.05 wt. % and about 0.5 wt. % of the cementitious composition; metakaolin and/or pumice in an amount between about 25 wt. % and about 50 wt. % of the cementitious composition; and silica fume in an amount of between about 0.01 wt. % and about 20 wt. % of the cementitious composition.

8. The composition of claim 7, wherein the aggregate comprises crushed stone, gravel, limestone, minerals, recycled concrete, sand, silicates, zeolites, and combinations thereof; and wherein the aggregate is in an amount of between about 30 wt. % and about 70 wt. % of the concrete.

9. The concrete composition of claim 7, further comprising at least one additional ingredient selected from the group consisting of an accelerator, a corrosion inhibitor, a plasticizer, a pigment, Portland cement, reflective particles, a retardant, and combinations thereof.

10. The concrete composition of claim 7, wherein the concrete is cured.

11. The concrete composition of claim 10, wherein the concrete composition is a molded product, new concrete surface, concrete overlay, patching of a concrete crack or hole, a beam, a brick, a floor, a parking block, a roadway, a sidewalk, a tile, and/or a wall.

12. The concrete composition of claim 7, wherein the saccharide comprises sucrose.

13. The concrete composition of claim 7, further comprising metal particles between about 0.0001 wt. % and about 5 wt. % of the cementitious composition.

14. The concrete composition of claim 9, wherein the concrete has one or more improved properties selected from the group consisting of increased flexural strength, increased compressive strength, reduced chloride ion permeability, reduced shrinkage, lower moisture emission, lower water absorption, and combinations thereof.

15. A method of preparing concrete:
   mixing an aggregate and a cementitious composition with water; wherein the water to cementitious composition ratio is less than about 0.6; wherein the cementitious composition comprises fly ash and/or slag cement in an amount between about 40 wt. % and about 55 wt. % of the cementitious composition; a saccharide in an amount between about 0.05 wt. % and about 0.5 wt. % of the cementitious composition; silica fume in an amount of between about 0.01 wt. % and about 20 wt. % of the cementitious composition; and metakaolin and/or pumice in an amount between about 25 wt. % and about 50 wt. % of the cementitious composition;
   applying the mixture of aggregate, cementitious composition and water; wherein applying comprises pouring, pumping, and/or shoveling;
   curing the mixture to form a cured concrete composition.

16. The method of claim 15, wherein the cured concrete composition is a molded concrete product, beam, brick, floor, parking block, roadway, sidewalk, tile, and/or wall.

17. The method of claim 15, wherein the cementitious composition further comprises metal particles between about 0.0001 wt. % and about 5 wt. % of the cementitious composition.

18. The method of claim 17, wherein the metal particles comprise zinc, and wherein the saccharide comprises sucrose.

19. The method of claim 15, wherein the wherein the concrete has one or more improved properties selected from the group consisting of increased flexural strength, increased compressive strength, reduced chloride ion permeability, reduced shrinkage, lower moisture emission, lower water absorption, and combinations thereof.

\* \* \* \* \*